(12) United States Patent
Herth

(10) Patent No.: US 6,943,295 B2
(45) Date of Patent: Sep. 13, 2005

(54) LOW VOLTAGE ELECTRICAL BOX

(76) Inventor: Greg Herth, 10 Tower Mews, Oakdale, NY (US) 11769

( * ) Notice: Subject to any disclaimer, the term of this patent is extended or adjusted under 35 U.S.C. 154(b) by 0 days.

(21) Appl. No.: 10/891,706

(22) Filed: Jul. 15, 2004

(65) Prior Publication Data
US 2005/0011662 A1 Jan. 20, 2005

Related U.S. Application Data
(60) Provisional application No. 60/488,506, filed on Jul. 19, 2003.

(51) Int. Cl.[7] .................................................. H01H 9/02
(52) U.S. Cl. ............................ 174/58; 174/53; 174/57; 174/50; 220/3.2; 248/906
(58) Field of Search .............................. 174/50, 53, 48, 174/57, 17 R, 54, 61, 62, 63; 220/3.2, 3.3, 3.4, 3.5, 3.6, 3.7, 3.8, 3.9, 4.02; 248/906, 343, 318; 439/534; D13/152

(56) References Cited

U.S. PATENT DOCUMENTS

| | | | | |
|---|---|---|---|---|
| 2,730,261 A | * | 1/1956 | Tutt | 220/3.7 |
| 2,757,817 A | * | 8/1956 | Egan | 220/3.5 |
| 4,788,383 A | * | 11/1988 | Caison | 174/48 |
| 5,448,012 A | * | 9/1995 | Jacob | 174/48 |
| 5,600,093 A | * | 2/1997 | Herth et al. | 174/53 |
| 6,093,890 A | | 7/2000 | Gretz | |
| D461,455 S | * | 8/2002 | Forbes | D13/152 |
| 6,452,098 B1 | | 9/2002 | Gretz | |
| 6,452,813 B1 | | 9/2002 | Gretz | |
| 6,756,541 B1 | * | 6/2004 | Mollick et al. | 174/58 |

* cited by examiner

Primary Examiner—Anthony Dinkins
Assistant Examiner—Angel R. Estrada
(74) Attorney, Agent, or Firm—Alfred N. Walker

(57) ABSTRACT

A dual use low voltage electrical box is useful for both old electrical work and new electrical work. The box includes a rectangular mounting plate, as well as top and bottom truncated, cut-off rectangle walls. Each of the truncated walls has a short edge parallel to the long edge, extending back from the front of the box. The short edge of the box is shorter than the long edge and the top and bottom walls each has a diagonal edge which extends from a rear of the short edge, to a shoulder joined to a rear of the long edge. This shoulder is located at a right angle to, and joins a rear of the mounting plate. The box is open in the front and receives a plate enclosing the front opening and providing entry for low voltage wires into the box.

7 Claims, 7 Drawing Sheets

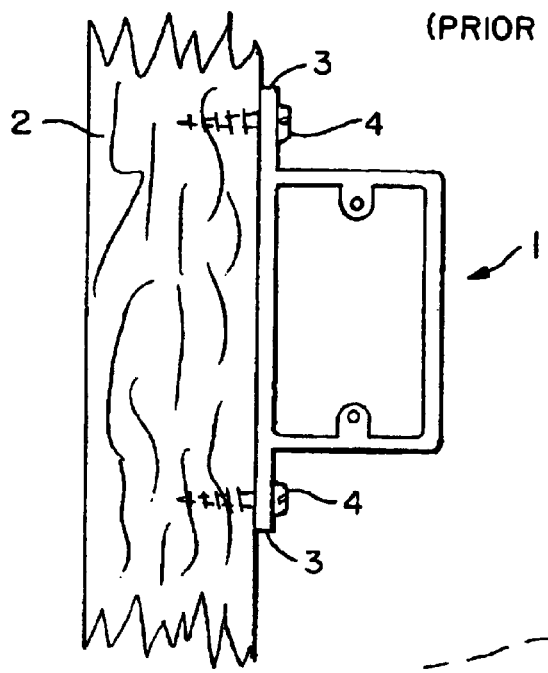
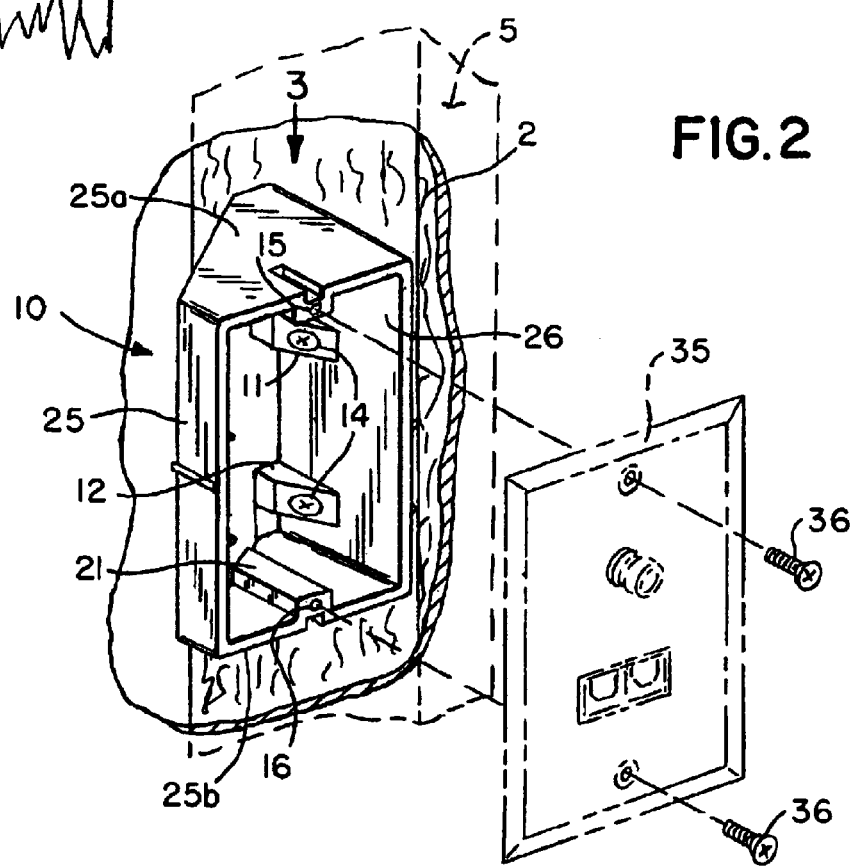

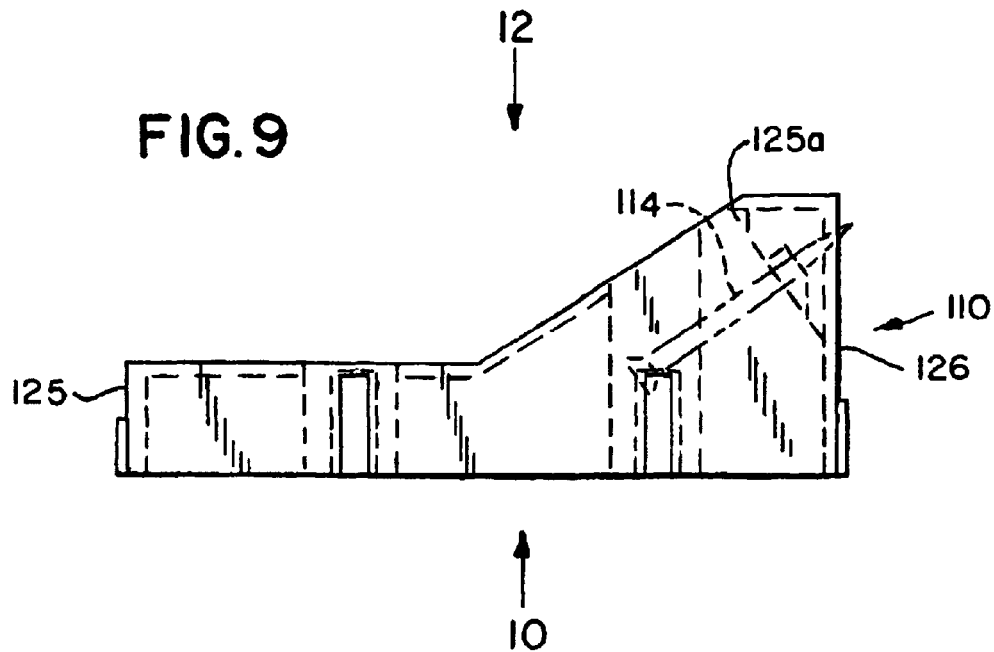
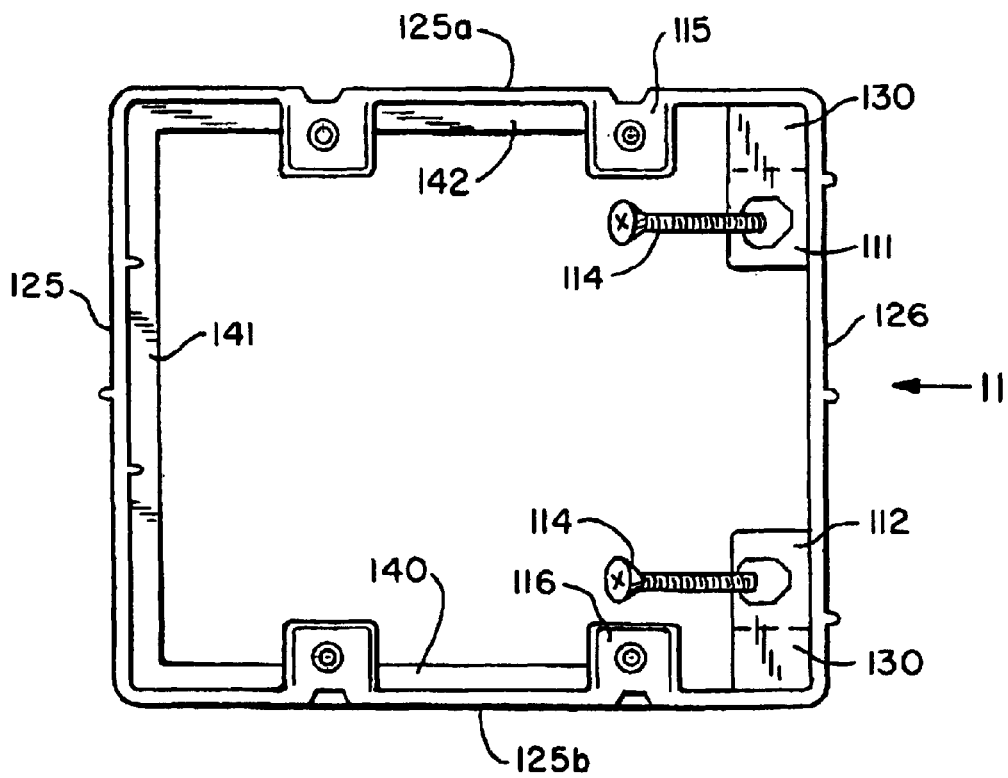

LOW VOLTAGE ELECTRICAL BOX

RELATED APPLICATIONS

This application is based upon provisional patent application No. 60/488,506 filed Jul. 19, 2003 and claims benefit under 35 USC § 119(e) thereof.

FIELD OF THE INVENTION

The present invention relates to electrical boxes for low voltage wiring, such as coaxial cables, Internet communication wiring, cable television wiring and telephone wiring.

BACKGROUND OF THE INVENTION

Low voltage electrical wiring are used for low voltage electrical applications, such as coaxial cable and/or telephone outlets which is needed in both new building construction (as "new work") or retrofitted in existing buildings. (as "old work").

Traditional utility power supplied higher voltage applications require closed-ended electrical work boxes, which are utilized in buildings to distribute electrical power from the power supply to electrical devices such as outlets or switches.

A traditional electrical workbox includes a metal or plastic housing containing a recess for electrical components such as wire outlets or switches.

Presently, conventional electrical boxes are referred to colloquially either new workboxes, for new building construction, or old workboxes, for retrofitting into existing buildings.

New workboxes have protruding accessory exterior sheaths for nailing the new workboxes to exposed wood or metal studs within a building. However, because the screw or nail mounting brackets protrude up from the external silhouette shape of the workbox, the brackets interfere with the flush mounting of the workbox within a hole within a building wall.

Moreover, old work boxes are frequently held in place by bent tabs which engage sheetrock boards thus minimizing stability, as the sheetrock is prone to gradually falling apart.

Existing workboxes for low voltage applications mainly include an open frame with a minimum of depth, wherein the frame is attached by fasteners above the confines of the workbox. However, in old work, adding fasteners above and/or below a workbox necessitates the removal of excess wall material, sheet rock, decorative wall coverings, etc.

In some applications, conventional, fairly flat "mud plates" are used to frame out the opening in a wall for low voltage wiring.

Among related patents for fairly flat, frame type openings with external fastener tabs, for low voltage wiring in a wall, include U.S. Pat. Nos. 6,452,813 B1 and 6,452,098 B1, both of Gretz, for terminal devices for low-voltage cable systems. U.S. Pat. No. 6,093,890, also of Gretz, describes a mounting device for low voltage cable wires, which can only be used with old electrical work in existing buildings.

Such prior art workboxes require protruding accessory exterior sheaths for nailing the workboxes to exposed wood or metal studs within a building. However, because the screw or nail mounting brackets protrude up from the external silhouette shape of the workbox, the brackets interfere with the flush mounting of the workbox within a hole within a building wall. Moreover, old work boxes are frequently held in place by bent tabs which engage sheetrock boards thus minimizing stability, as the sheetrock is prone to gradually falling apart.

However, the aforementioned devices are not easily mountable to a stud in a wall, without having exterior fasteners on the frame, and these patents do not describe a low voltage work box for both new and old low voltage electrical work, which is sturdy in construction and which can be easily mounted to a building stud, with minimal damage to surrounding wall surfaces.

An improvement in electrical work boxes for high voltage utility supplied voltage workboxes is shown in Applicant's U.S. Pat. No. 5,600,093 of Herth and Davis, which describes an electrical work box for new work and old work, wherein a novel attachment is described for attaching the electrical work box to a building stud via an angled screw mount within the electrical work box.

However, Herth and Davis '093 describes a closed-ended electrical workbox, which is not needed for low voltage wiring applications.

OBJECTS OF THE INVENTION

It is therefore an object of the present invention to provide a low voltage work box for both new and old low voltage electrical work, which is sturdy in construction and which can be easily mounted to a building stud, with minimal damage to surrounding wall surfaces. It is also an object to provide wide multiple gauge low voltage work boxes.

Other objects which become apparent from the following description of the present invention.

SUMMARY OF THE INVENTION

In keeping with these objects and others which may become apparent, the present invention is a dual purpose low voltage electrical work box typically for coaxial cable and/or telephone outlets, which is equally as useful for new building construction (as a new work box) or retrofit (as an old work box).

The low voltage electrical workbox of the present invention uses internal built-in angled fastener mounting bracket channel sheaths, to avoid the use of any external screw mounting bracket protrusions. These internal angled fastener mounting channel sheaths were first described in the Applicants' earlier U.S. Pat. No. 5,600,093 as attached to a closed-ended electrical box used for house wiring of switches and outlets.

In contrast to Herth and Davis '093, the low voltage workbox of this invention has an open back and is of sturdy molded plastic construction. It accommodates standard low voltage outlet mounting plates.

Since the internal angled fastener brackets accommodate nails, wood screws, or self-tapping screws, mounting to wood, aluminum, or steel studs used in home or commercial construction is easily accomplished.

The low voltage work box of this invention is interchangeable, so that it can be mounted to on either the left or right side of a wall stud since the top and bottom have mirror image configurations permitting mounting in the upside down position.

In its preferred embodiment, the terminal or junction box for a low-voltage electrical distribution system structurally includes an outer rectangular mounting plate attached to top and bottom truncated, rectangle walls. Each of these truncated, cut-off walls has a long edge joining top and bottom edges, respectively, of the mounting plate and a front edge at right angles to the long edge. Each of these top and bottom walls includes a short edge, which is parallel to the long edge, extending back from the front edge. This short edge is shorter than the long edge and the top and bottom walls each include a diagonal edge, which extends from a rear end of the short edge, to a shoulder joined to a rear end of the long edge. This shoulder is positioned at a right angle to, and joins a rear end of, the mounting plate.

The low voltage box is open in the front and receives a plate, which encloses the front opening and which provides entry for low voltage wires into the low voltage box.

The low voltage box has an opening between the aforementioned diagonal sides for a distribution network and one or more internal fastener brackets, which are nestled between the shoulder and the mounting plate. These brackets having openings for fasteners at a diagonal to and through the mounting plate, to attach the low voltage box to a stud or other surface.

As a result, the low voltage box is mounted without any external extensions.

Preferably, the low voltage terminal or junction box includes extension plates joining the internal fastener brackets to the mounting plate and the top and bottom walls, respectively, to prevent distortion of the low voltage box.

The low voltage terminal or junction box further optionally includes front plate mounting brackets on the top and bottom walls within the box, and channels extending back from the brackets, along the top and bottom walls, to reinforce the brackets.

BRIEF DESCRIPTION OF THE DRAWINGS

The present invention can best be understood in connection with the accompanying drawings. It is noted that the invention is not limited to the precise embodiments shown in drawings, in which:

FIG. 1 is a side elevational view of a prior art low voltage electrical workbox;

FIG. 2 is a perspective exploded cutaway view of the present invention, showing the dual purpose low voltage electrical work box mounted to a structural stud, and showing the face plate in phantom for environmental purposes only;

FIG. 9 is a top plan view of the dual-purpose, two gang, low voltage electrical workbox, as in FIG. 8;

FIG. 10 is a front elevational view taken on arrow "10" of FIG. 9, looking into the dual-purpose, two gang low voltage electrical work box;

DETAILED DESCRIPTION OF THE INVENTION

Figure 3:
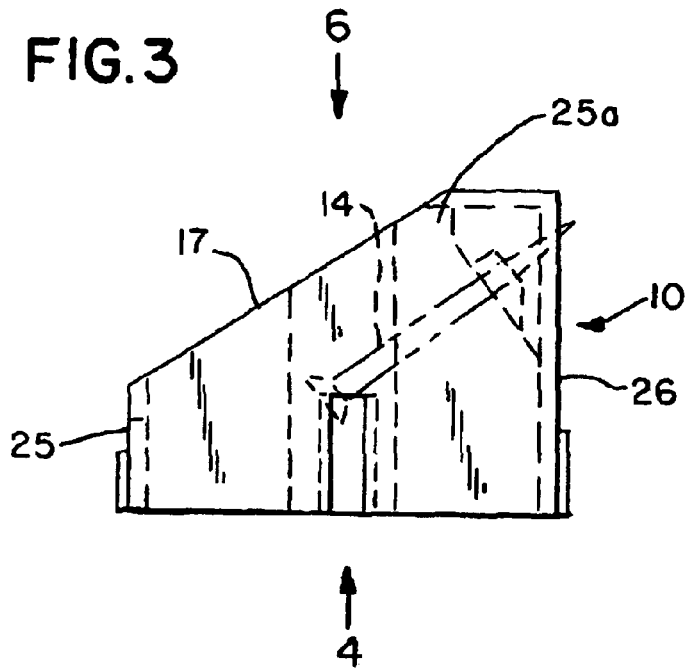
FIG. 3 is a top plan view of the dual-purpose low voltage electrical workbox, as in FIG. 2.

FIG. 1 shows a prior art low voltage box 1, which is attached to wall stud 2 with screws 4 in brackets 3 protruding from the side of prior art box 1.

FIG. 1 also shows that it would be not be possible to mount prior art box 1 to stud 2 through a rectangular hole in wall sheet rock the size of the box face. Box 1 is therefore used in new construction and is mounted before wall sheeting is installed. It would not be used for retrofit work where an existing wall must be penetrated.

Low voltage box 10 of this invention, as depicted in the various views of FIGS. 2 through 6, is equally useful for new construction as well as retrofit work.

As shown in FIG. 2, low voltage box 10 includes primarily a vertically extending fastener wall 26 having a depth deeper than a cantilevered ring edge casing portion, such as horizontally top wall 25a joined by vertically extending distal side wall 25 to bottom wall 25b, in a three sided C-shape configuration. Top wall 25a and bottom wall 25b are truncated rectangles, joining the shorter depth distal wall 25 to deeper fastener wall 26.

This configuration of fastener wall 26 having a depth significantly greater than distal wall 25 minimizes the material needed for distal wall 25, while still providing a framed opening for inserting low voltage wires therethrough.

The minimal depth of distal wall 25 also allows for wide access to back opening 17 through which low voltage wires are passed. Likewise, the deeper fastener wall 26 allows for the angled entry of fasteners 14 into stud 2, as described in Applicants' '093 patented electrical work box, but without the closed ended box therein, through which multiple, thick bundles of low voltage wires cannot pass.

However, with such an angled mount, Applicants' low voltage work box 10 avoids the external fasteners disclosed in the prior art low voltage outlet frames, which require protruding accessory exterior sheaths for nailing the work boxes to exposed wood or metal studs within a building, which protrude up from the external silhouette shape of the work box and which interfere with the flush mounting of the work box within a hole within a building wall.

Moreover, the present invention avoids the problem of old work boxes being held in place by bent tabs, which engage sheetrock boards thus minimizing stability, as the sheetrock is prone to gradually falling apart.

Low voltage box 10 can be easily installed through a rectangular hole in wall 5, as in FIG. 2, by using mounting screws 14 in two internal angled brackets 11 and 12 for attachment to stud 2. Top and bottom plate mount brackets 15 and 16 respectively accept plate screws 36 to attach plate 35 which may have coaxial cable outlets, telephone outlets, or one of each as shown.

The top plan view of FIG. 3 shows the location of back opening 17, short side 25 and deep side 26 through which fasteners 14 emerge.

Figure 4:
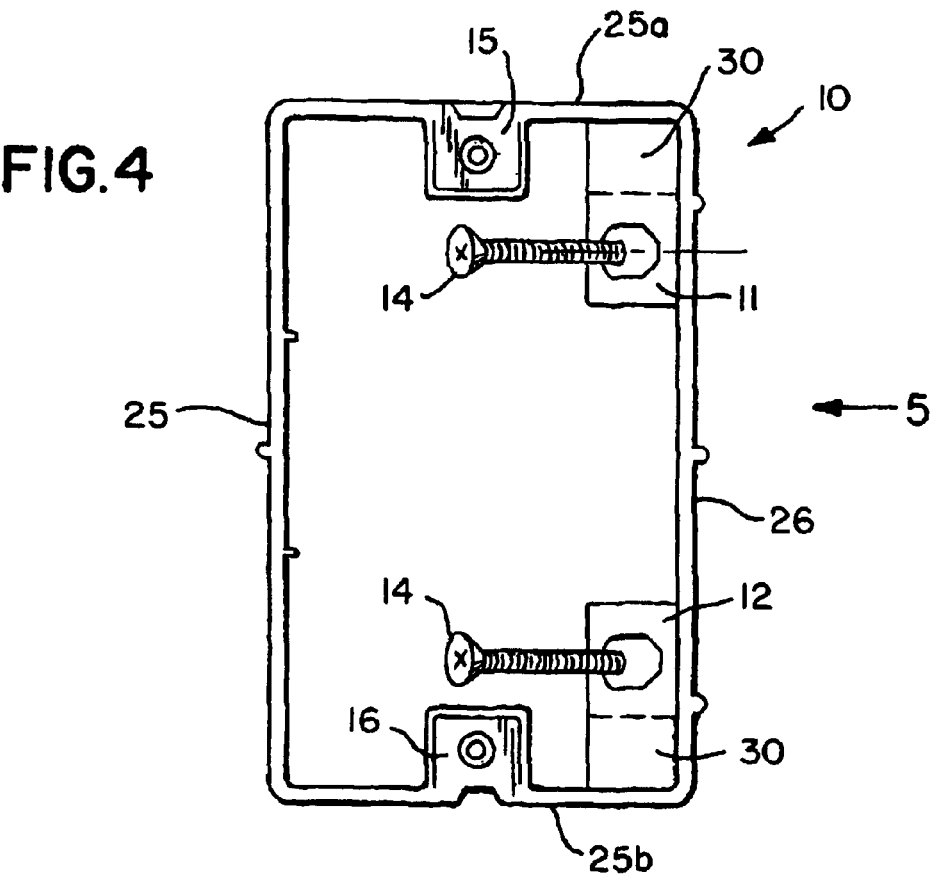
FIG. 4 is a front elevational view taken on arrow "4" of FIG. 3, looking into the dual-purpose low voltage electrical work box.

The front view of FIG. 4 shows top angled fastener bracket 11 emerging from wall 26 and further reinforced with extension plate 30 molded so as to rigidly attach wall 26 to the top of box 10, thereby resisting "parallelogram" distortion. A similar plate 30 on the bottom ties wall 26 to the bottom of box 10 and reinforces bottom angled bracket 12; this also keeps box 10 square at the corner.

Figure 5:
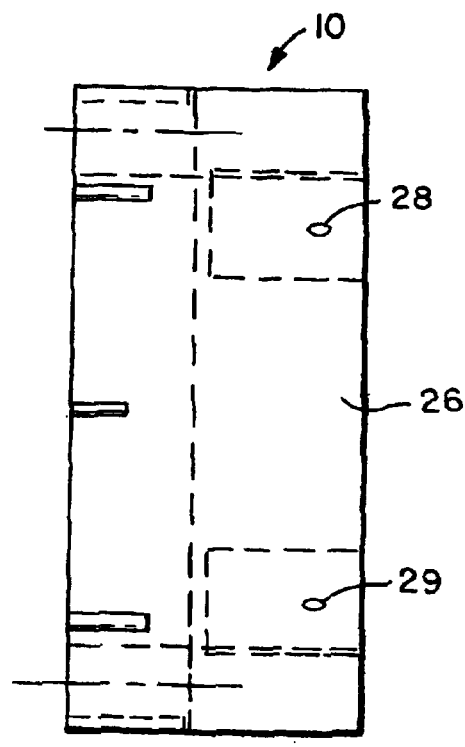
FIG. 5 is a right side elevational view thereof, taken in the direction of arrow "5" of FIG. 4; and, FIG. 6 is a rear elevational view thereof, taken in the direction of arrow "6" of FIG. 4.

The side view of FIG. 5 shows holes 28 and 29 through side 26; these are the exit holes of angled brackets 11 and 12 respectively for fasteners 14.

Figure 6:
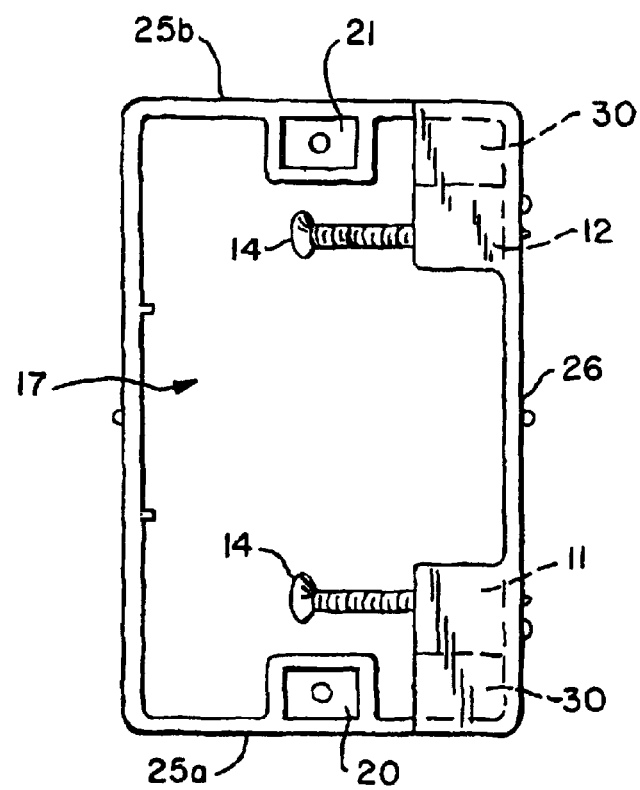

The rear view of FIG. 6 shows hollow channels 20 at the top and 21 at the bottom molded so as to reinforce plate-mounting brackets 15 and 16 respectively.

Figure 7:
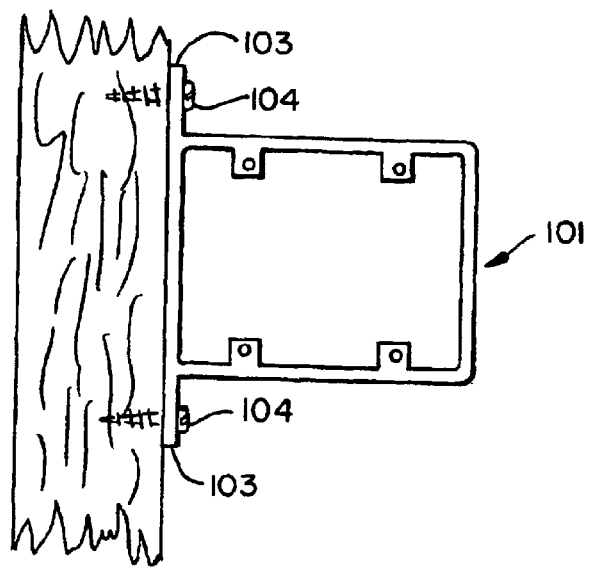
FIG. 7 is a side elevational view of a prior art two gang low voltage electrical workbox.

FIG. 7 shows a prior art two gang low voltage box 101, which is attached to wall stud 102 with screws 104 in brackets 103 protruding from the side of prior art box 101.

FIG. 7 also shows that it also would be not be possible to mount prior art box 101 to stud 102 through a rectangular hole in wall sheet rock the size of the box face. Box 101 can only be used in new construction and is mounted before wall sheeting is installed. It can not be used for retrofit work where an existing wall must be penetrated.

Low voltage box 110 of this invention, as shown in FIGS. 8 through 12, can be used for new work construction as well as retrofit work.

Figure 8:
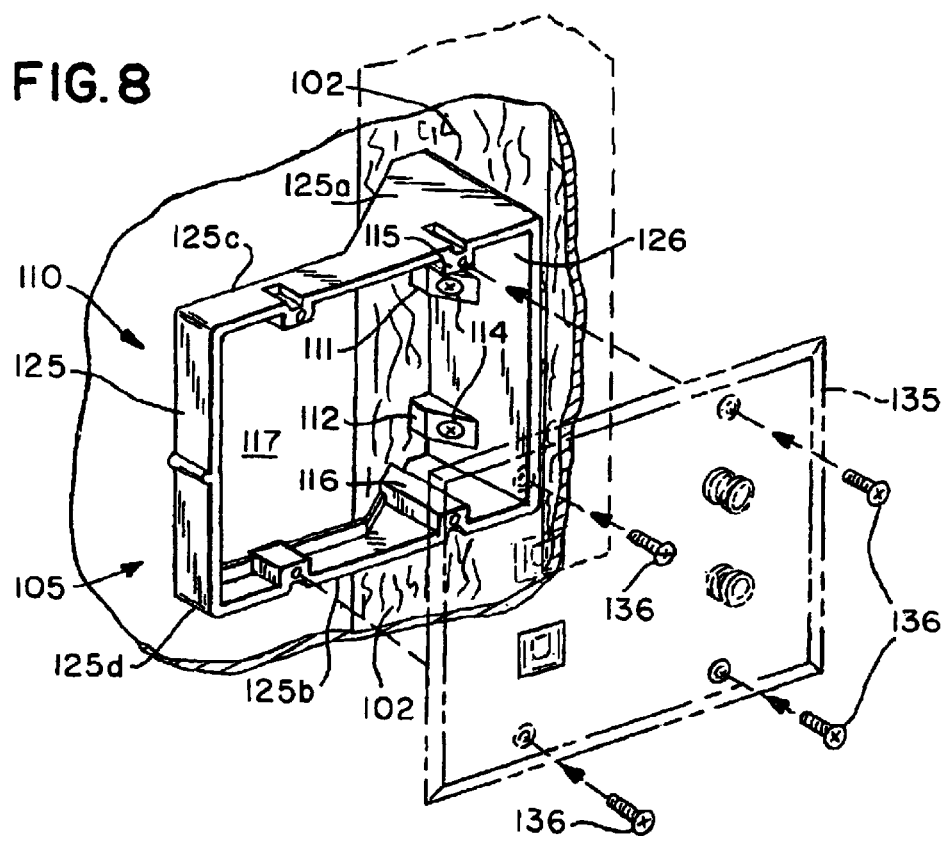
FIG. 8 is a perspective exploded cutaway view of a two gang embodiment of the present invention, showing the dual purpose, two gang low voltage electrical work box mounted to a structural stud, and showing the dual face plate in phantom for environmental purposes only.

As shown in FIG. 8, low voltage box 110 includes primarily a vertically extending fastener wall 126 having a depth deeper than a cantilevered ring edge casing portion, such as horizontally top wall 125a joined by vertically extending distal side wall 125 to bottom wall 125b, in a three sided squared-off C-shape configuration. Top wall 125a and bottom wall 125b are truncated rectangles with extension wings 125c and 125d, joining the shorter depth distal wall 125 to deeper fastener wall 126.

This configuration of fastener wall 126 having a depth significantly greater than distal wall 125 minimizes the material needed for distal wall 125, while still providing a framed opening for inserting low voltage wires therethrough.

The minimal depth of distal wall 125 also allows for wide access to back opening 117 through which low voltage wires are passed. Likewise, the deeper fastener wall 126 allows for the angled entry of fasteners 114 into stud 102, but without the closed ended box therein, through which multiple, thick bundles of low voltage wires cannot pass.

However, with such an angled mount, Applicants' low voltage work box 110 avoids the external fasteners disclosed in the prior art low voltage outlet frames, such as in FIG. 7, which require protruding accessory exterior sheaths for nailing the work boxes to exposed wood or metal studs within a building, which protrude up from the external silhouette shape of the work box and which interfere with the flush mounting of the work box within a hole within a building wall.

Moreover, the present invention avoids the problem of old work boxes being held in place by bent tabs, which engage sheetrock boards thus minimizing stability, as the sheetrock is prone to gradually falling apart.

Low voltage box 110 can be easily installed through a rectangular hole in wall 105, as in FIG. 8, by using mounting screws 114 in two internal angled brackets 111 and 112 for attachment to stud 102. Top and bottom plate mount brackets 115 and 116 respectively accept plate screws 136 to attach plate 135 which may have coaxial cable outlets, telephone outlets, or one of each as shown.

The top plan view of FIG. 9 shows the location of back opening 117, short side 125 and deep side 126 through which fasteners 114 emerge. Top wall 125a is increased in width by wing 125c to accommodate two gang cover 135.

The front view of FIG. 10 shows top angled fastener bracket 111 emerging from wall 126 and further reinforced with extension plate 130 molded so as to rigidly attach wall 126 to the top of box 110, thereby resisting "parallelogram" distortion. A similar plate 130 on the bottom ties wall 126 to the bottom of box 110 and reinforces bottom angled bracket 112; this also keeps box 110 square at the corner.

Figure 11:
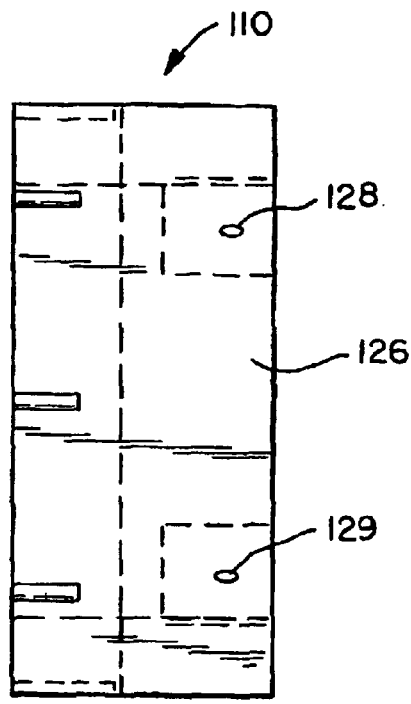
FIG. 11 is a right side elevational view thereof, taken in the direction of arrow "12" of FIG. 10.

The side view of FIG. 11 shows holes 128 and 129 through side 126; these are the exit holes of angled brackets 111 and 112 respectively for fasteners 114.

Figure 12:
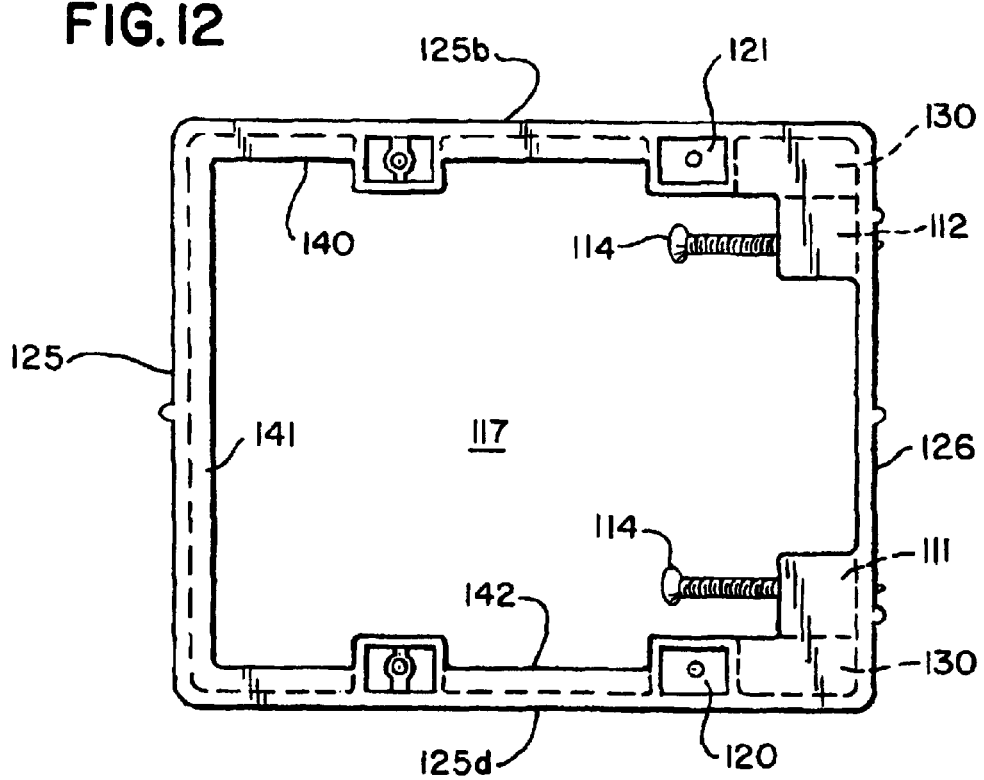
FIG. 12 is a rear elevational view thereof, taken in the direction of arrow "12" of FIG. 10.

The rear view of FIG. 12 shows that rear top and bottom frame brackets 140, 141 add rigidity to rearwardly hollow channels 120 at the top and 121 at the bottom molded so as to reinforce plate-mounting brackets 115 and 116 respectively.

While FIGS. 1–6 depict a single gang low voltage box and FIGS. 7–12 depict wider two gang low voltage boxes, it is noted that other configurations may be provided, such as triple gang low voltage boxes where three groups of low voltage wires are attached to a wide low voltage cover plate.

Figure 13:
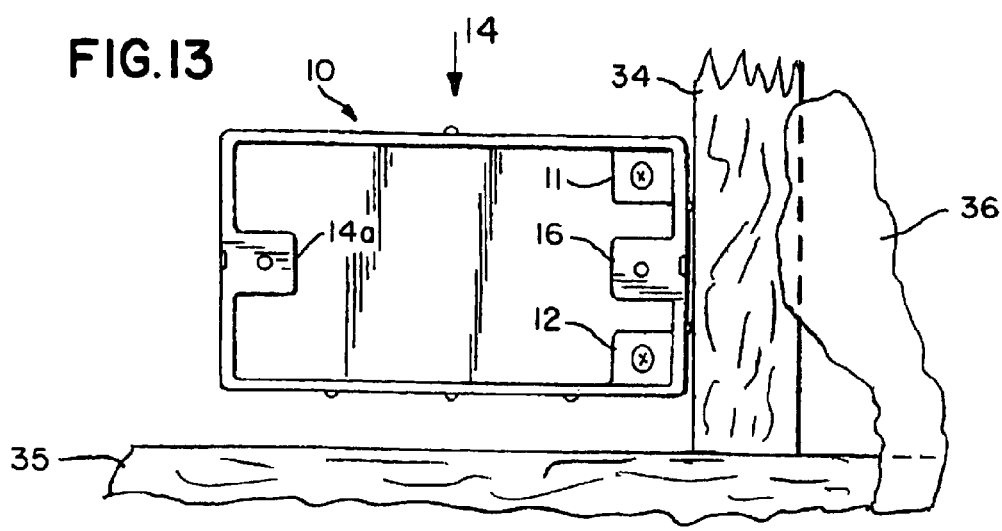
FIG. 13 is a side elevational view of a horizontally oriented low voltage electrical workbox.
Figure 14:
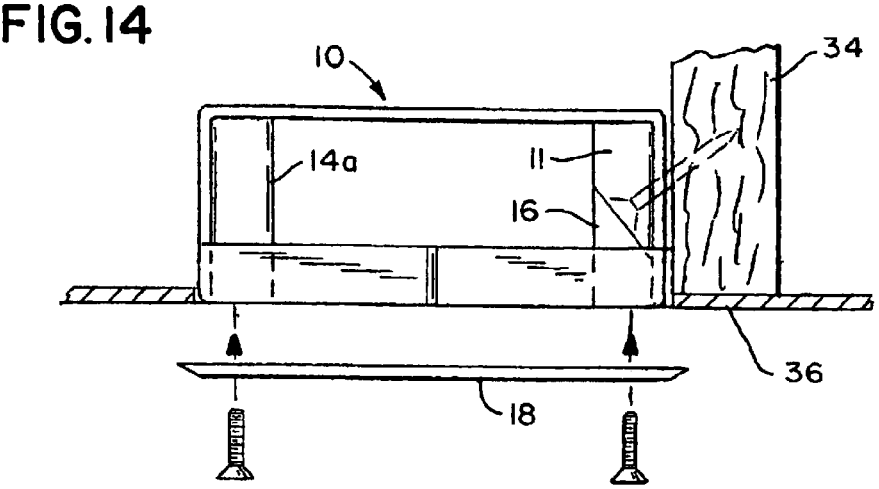
FIG. 14 is a top plan view of the low voltage electrical workbox as in FIG. 13; and, FIG. 15 is a perspective exploded cutaway view of the present invention, showing the dual purpose low voltage electrical work box mounted horizontally to a structural stud, and showing the face plate in phantom for environmental purposes only.
Figure 15:
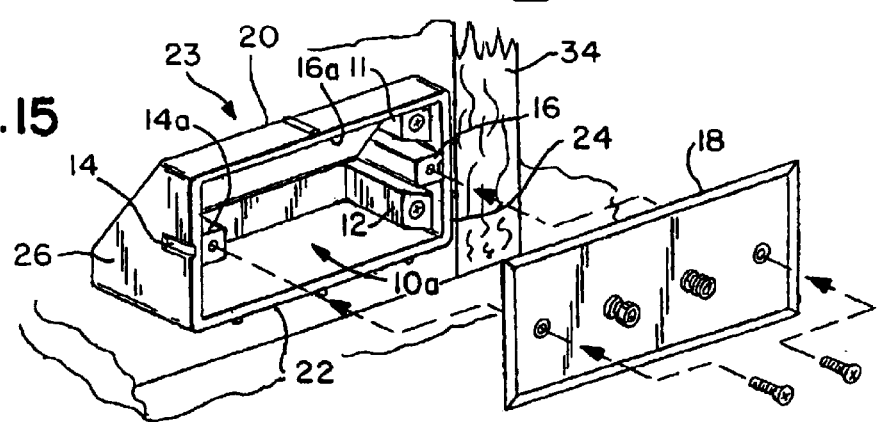

In addition, as shown in FIGS. 13–15, low voltage box 10 includes primarily a vertically extending fastener wall 26 having a depth deeper than a cantilevered ring edge casing portion, such as horizontally top wall 25a joined by vertically extending distal side wall 25 to bottom wall 25b, in a three sided C-shape configuration. Top wall 25a and bottom wall 25b are truncated rectangles, joining the shorter depth distal wall 25 to deeper fastener wall 26.

This configuration of fastener wall 26 having a depth significantly greater than distal wall 25 minimizes the material needed for distal wall 25, while still providing a framed opening for inserting low voltage wires therethrough.

The minimal depth of distal wall 25 also allows for wide access to back opening 17 through which low voltage wires are passed. Likewise, the deeper fastener wall 26 allows for the angled entry of fasteners 14 into stud 26, as described in Applicants' '093 patented electrical work box, but without the closed ended box therein, through which multiple, thick bundles of low voltage wires cannot pass.

With such a horizontally angled mount of FIGS. 13–15, Applicants' low voltage work box 10 avoids the external fasteners disclosed in the prior art low voltage outlet frames, which require protruding accessory exterior sheaths for nailing the work boxes to exposed wood or metal studs within a building, which protrude up from the external silhouette shape of the work box and which interfere with the flush mounting of the work box within a hole within a building wall.

Moreover, the present invention avoids the problem of old work boxes being held in place by bent tabs, which engage sheetrock boards thus minimizing stability, as the sheetrock is prone to gradually falling apart.

Low voltage box 10 can be easily installed through a rectangular hole in wall 5, as in FIG. 15, by using mounting screws 14 in two internal angled brackets 11 and 12 for attachment to stud 2. Top and bottom plate mount brackets 15 and 16 respectively accept plate screws 36 to attach plate 35 which may have coaxial cable outlets, telephone outlets, or one of each as shown.

The top plan view of FIG. 14 shows the location of back opening 17, short side 25 and deep side 26 through which fasteners 14 emerge.

The front view of FIG. 13 shows top angled fastener bracket 11 emerging from wall 26 and further reinforced with extension plate 30 molded so as to rigidly attach wall 26 to the top of box 10, thereby resisting "parallelogram" distortion. A similar plate 30 on the bottom ties wall 26 to the bottom of box 10 and reinforces bottom angled bracket 12; this also keeps box 10 square at the corner.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing from the scope of the invention, as noted in the appended claims.

I claim:

1. A dual use terminal or junction box for installation of new electrical work or old electrical work for a low-voltage wiring distribution system, said box comprising:

a rectangular mounting plate;

top and bottom truncated, rectangle walls each having a long edge joining top and bottom edges, respectively, of said mounting plate and a front edge at right angles to said long edge;

each of said top and bottom walls having a short edge parallel to said long edge extending back from said front edge, said short edge being shorter than said long edge, said top and bottom walls each having a diagonal edge extending from a rear end of said short edge to a shoulder joined to a rear end of said long edge, said shoulder being at right angle to and joining a rear end of said mounting plate;

said box being open in the front and having means for receiving a plate to enclose said front opening and provide entry for low voltage wires into said box;

said box having an opening between said diagonal edges for a distribution network; and at least one internal fastener bracket nestled between said shoulder and said mounting plate having openings for fasteners at a diagonal to and through said mounting plate for attachment to a stud or other surface for mounting said box, said box thereby being mounted without any external extensions.

2. The terminal or junction box of claim 1 having extension plates joining each said internal fastener bracket to said mounting plate and top and bottom walls, respectively, to prevent distortion of said box.

3. The terminal or junction box of claim 1 having front plate mounting brackets on said top and bottom walls within said box and channels extending back from said front plate mounting brackets along said top and bottom walls for reinforcement of said brackets.

4. The terminal or junction box as in claim 1 wherein said at least one internal fastener bracket is a pair of internal fastener brackets.

5. The terminal or junction box as in claim 1 wherein said at least one internal fastener bracket is a plurality of internal fastener brackets.

6. A dual use terminal or junction box for installation of new electrical work or old electrical work for a low-voltage wiring distribution system, said box comprising:

a housing attachable to a wall stud with fasteners protruding from a side of said housing;

said housing having a vertically extending fastener wall having a depth deeper than an opposite distal vertically extending wall, said fastener wall attached to a cantilevered ring edge casing portion of said box, said ring edge comprising a horizontally extending top wall joined by said opposite distal vertically extending wall to a lower wall, in a three sided C-shape configuration, said top wall and said lower wall being truncated rectangles, joining said opposite shorter depth distal wall to said deeper fastener wall;

said shorter distal wall and said deeper fastener wall having an unrestricted open recess therebetween, said recess opening providing a framed opening for inserting low voltage wires therethrough; and internal angled brackets nestled against a rear edge of said fastening wall having openings for said fasteners at a diagonal to and through said fastening wall for attachment to a stud or other surface for mounting said box, said box thereby being mounted without any external extensions.

7. A dual use terminal or junction box for installation of new electrical work or old electrical work for a low-voltage wiring distribution system, said box comprising:

a mounting plate wall mountable to a wall stud;

top and bottom walls each having an edge joining top and bottom edges, respectively, of said mounting plate and a front edge at tight angles to said edge;

each of said top and bottom walls having a further edge parallel to said edge extending back from said front edge, an outer wall opposite said mounting plate wall, said mounting plate wall, said top and bottom walls and said outer wall defining an open annular ring with a rectangular front opening;

said open annular ring having an unrestricted open recess therebetween, said recess opening providing a framed opening for inserting low voltage wires therethrough said box being open in the front and having means for receiving a plate to enclose said front opening and provide entry for low voltage wires into said box;

said box having an opening between said edges for a distribution network; and at least one internal fastener bracket nestled against said mounting plate wall and said mounting plate wall having openings for fasteners at a diagonal to and through said mounting plate wall for attachment to a stud or other surface for mounting said box, said box thereby being mounted without any external extensions.

* * * * *